A. G. WORKMAN.
MUD SHOE.
APPLICATION FILED SEPT. 23, 1920.

1,373,042.

Patented Mar. 29, 1921.
2 SHEETS—SHEET 1.

Inventor
Aaron G. Workman.
By Lancaster and Allwine
Attorneys

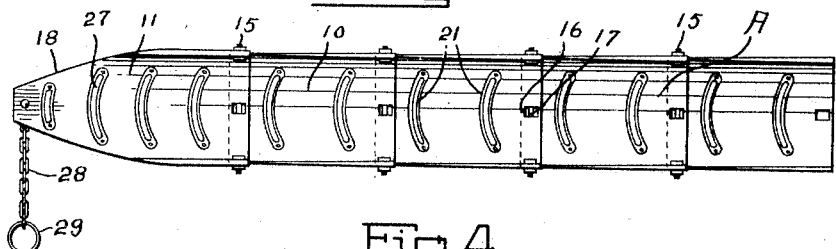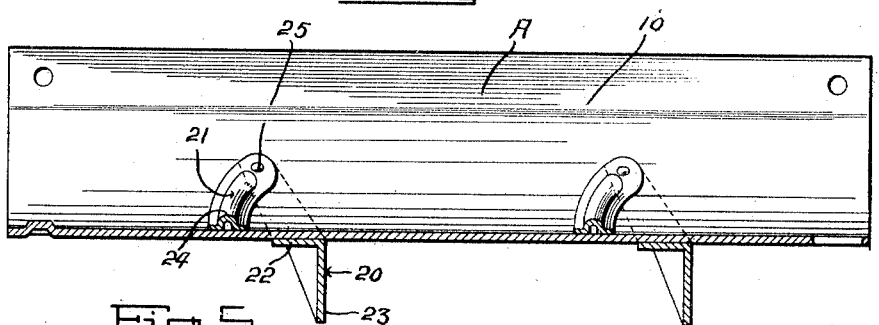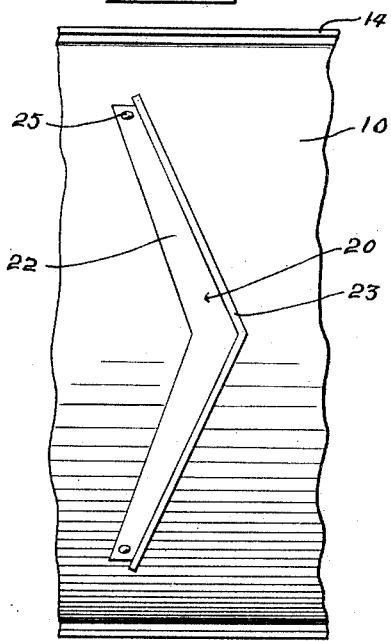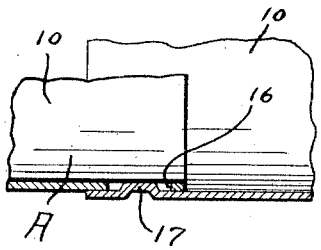

UNITED STATES PATENT OFFICE.

AARON G. WORKMAN, OF HOT SPRINGS, SOUTH DAKOTA.

MUD-SHOE.

1,373,042.  Specification of Letters Patent.  Patented Mar. 29, 1921.

Application filed September 23, 1920. Serial No. 412,160.

*To all whom it may concern:*

Be it known that I, AARON G. WORKMAN, a citizen of the United States, residing at Hot Springs, in the county of Fall River and State of South Dakota, have invented certain new and useful Improvements in Mud-Shoes, of which the following is a specification.

This invention relates to mud shoes and the primary object of the invention is to provide a portable device for motor vehicles, which is so constructed as to permit the traction wheels of a motor vehicle to obtain a firm hold upon the ground when stuck in a mud hole, rut or the like and thus facilitate the movement of the motor vehicle.

Another object of the invention is to provide an improved means for facilitating the movement of a motor vehicle from out of a mud hole or the like, which consists of a plurality of pivoted sections having a means for engaging the ground to prevent movement of the device in relation to the ground, and means for engagement with the vehicle wheel tires, so as to prevent the slipping of the tires in relation thereto.

A further object of the invention is to provide a device for permitting the wheels of a motor vehicle to take hold of a slippery surface or the like, which is so constructed that the engagement thereof with the tire of a motor vehicle will be facilitated, so that upon rotation of the wheels, the same will immediately engage the device so as to permit the forward movement of the vehicle.

A still further object of the invention is to provide an improved vehicle attachment of the above character which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings:

Fig. 3 is a top plan view of the improved device.

Fig. 4 is a longitudinal section through one of the sections of the improved device.

Fig. 5 is an enlarged fragmentary bottom plan view of the device showing the formation of one of the cleats for engaging the ground, and Fig. 6 is an enlarged fragmentary longitudinal section through the device illustrating the means of connecting the sections together.

Figure 1:
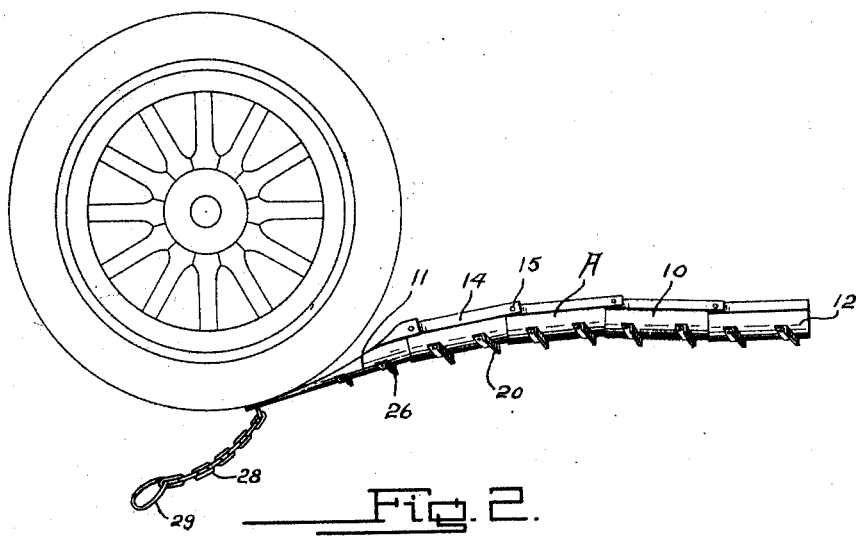
Figure 1 is a side elevation of the improved device showing one end thereof lowered into a depression and positioned beneath an automobile wheel.
Figure 2:
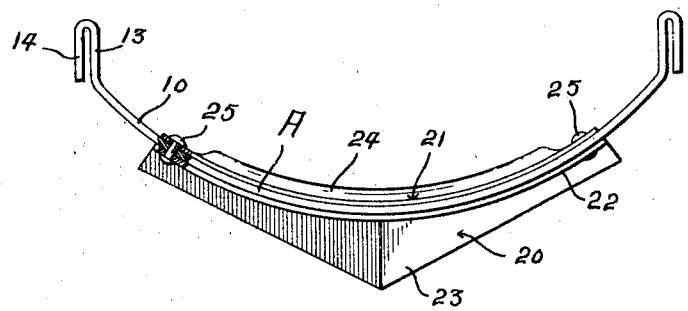
Fig. 2 is an end elevation of the improved device showing parts of the same in section, and illustrating the means of connecting the ground and tire engaging cleats to the device.

Referring to the drawings in detail, wherein similar reference characters designate corresponding parts throughout the several views, the letter A generally indicates the improved device, which includes a plurality of body sections 10 and an inner end section 11, which is adapted to be placed beneath a wheel when the device is first being placed in position.

There may be as many of the sections 10 as desired or practical and each one includes a longitudinally extending body 12, which is curved transversely to conform to the transverse curvature of a tire. It is desirable, however, that the radius of the transverse curvature of each one of the sections be considerably greater than the transverse curvature of a tire, so that the device will be applicable to all shapes and sizes of tires. The longitudinal edges of each of the sections 10 terminate in straight vertically disposed walls 13, and these walls are provided with down-bent flanges 14, which form means for bracing the bodies longitudinally.

The sections are adapted to overlap each other as clearly shown in Figs. 3 and 6 of the drawings and the same are suitably connected together at their opposite edges by means of removable bolts 15. The central portions of the bodies are connected together in such a manner that limited movement is permitted between the same, and it can be seen that by referring to Fig. 6 of the drawings, one end of each section is provided with a slot 16 and the opposite end with an upstruck lug 17, which is adapted to be positioned in the slot in the next adjacent section.

The end section 11 is formed similar to the body sections 10 with the exception that its free end is tapered as at 18, so as to facilitate the insertion thereof underneath a vehicle wheel, as clearly shown in Fig. 1 of the drawings. As this section is rigid, the same can be used in the nature of a shovel so as to permit the easy insertion thereof under the vehicle wheel. This section 11 is secured in the same manner to the sections 10 as the sections are secured to each other.

Each of the sections 10 have secured to their lower surface ground engaging cleats 20 and to their upper surface tire engaging cleats 21. The ground engaging cleats 20 are substantially V-shaped in plan and extend transversely across the lower surface of the sections 10 and are angular shaped in cross section to provide a section engaging body 22 and the ground cleat engaging body 23.

The tire engaging cleats are arcuate in plan and extend transversely across the upper surface of the sections 10 and are provided with a centrally disposed upstruck rib 24 which forms the means for preventing the slipping of a tire on the upper surface of the sections. As clearly shown in Fig. 4 of the drawings, the ground engaging cleats 20 extend in the direction of rotation of the wheel while the tire engaging cleats extend in the opposite direction, but the same are so positioned on the sections that the terminals thereof overlie one another, and these terminals are secured to the sections 10 by means of rivets or the like 25. The arrangement of the cleats on the sections 10 is such as to brace the sections transversely so as to prevent the breaking or distorting thereof. The end section 11 is also provided with ground engaging cleats 26 and with tire engaging cleats 27 and these cleats are formed exactly like the cleats 20 and the cleats 21, with the exception that the cleats 27 which are similar to the cleats 21 are decreased in width toward the narrow or tapered end 18 of the section.

A short chain 28 is connected to one end of the device and the free end of the chain is provided with a hand hold 29 whereby the device can be readily pulled out of the mud after a vehicle wheel has ridden off of the same.

In operation of the device, when a vehicle becomes stuck and the traction wheels thereof cannot obtain a firm grip on the ground, the tapered end 18 of the end section 11 is inserted under the tire and when power is applied to the vehicle, it can be seen that the tire will engage the cleats on the upper surface of the sections and wheels will ride up on the device to firm ground.

From the construction of the improved device, it can be seen that the sections are permitted to move in relation to each other so that it is permitted to flex within certain limits and thus conform to the configuration of the tire and to the hole or rut with which it is used.

Changes in details may be made without departing from the spirit or scope of this invention as defined in the accompanying claims; but,

I claim:

1. A portable traction device for motor vehicles comprising a plurality of sections and traction lugs carried by the upper and lower surfaces of the sections.

2. A portable traction device for motor vehicles comprising a plurality of sections, means connecting the sections together to permit swinging movement of the sections in relation to each other, transversely extending tire engaging cleats carried by the upper surface of the sections, and ground engaging cleats carried by the lower surface of the sections.

3. A portable traction device for motor vehicles comprising a plurality of transversely curved body sections, means for pivotally connecting the body sections together, and an end section pivotally connected to one of the body sections having its free end tapered to facilitate the insertion thereof under a vehicle wheel.

4. A traction device for motor vehicles comprising a plurality of transversely curved sections, flanges formed on the longitudinal edges of the sections, ground engaging cleats carried by the lower surface of the sections, tire engaging cleats carried by the upper surface of the sections, the terminals of the ground and tire engaging sections being arranged in alinement with each other, and fastening elements extending through said alined terminals and the sections.

5. A traction device for vehicles comprising a plurality of sections, the sections being curved transversely and having their terminals arranged in overlapped relation, removable pivot bolts extending through the opposite sides of the sections, one end of the sections having slots formed therein, the other ends of the sections having struck up lugs arranged to fit in the slots of the next adjacent section, V-shaped ground engaging lugs carried by the lower surface of each of the sections, semi-circular tire engaging lugs carried by the upper surface of the sections, the ground and tire engaging lugs being extended in opposite directions, and means connecting the lugs to the sections.

AARON G. WORKMAN.